J. W. HUNTOON.
Grain Separator.
No. 111,347. Patented Jan. 31, 1871.
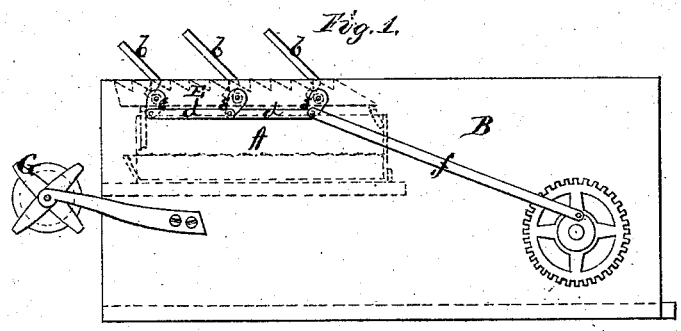
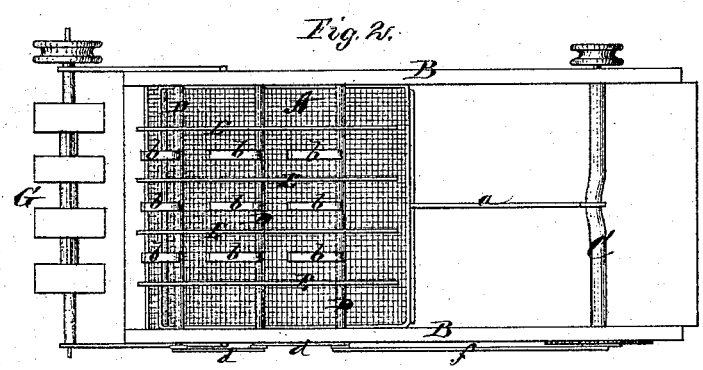
Witnesses
Jno. A. Ellis
Jas. V. White
Inventor
James W. Huntoon,
Per,
J. H. Alexander
Atty.

United States Patent Office.

JAMES W. HUNTOON, OF ST. LOUIS, MISSOURI.

Letters Patent No. 111,347, dated January 31, 1871.

IMPROVEMENT IN GRAIN-SEPARATORS FOR THRASHING-MACHINES.

The Schedule referred to in these Letters Patent and making part of the same.

*To all whom it may concern:*

Be it known that I, JAMES W. HUNTOON, of St. Louis, in the county of St. Louis and State of Missouri, have invented certain new and useful Improvements in "Thrashing-Machine Separators;" and I do hereby declare that the following is a full, clear, and exact description thereof, reference being had to the accompanying drawing and to the letters of reference marked thereon.

The nature of my invention consists—

First, in the construction and arrangement of shafts with arms directly over the screen-shoe;

Second, in the application of toothed bars to the top of the screen-shoe; and

Third, in the application of a revolving fan or fork in the rear of the machine and separate from it.

In order to enable others skilled in the art to which my invention appertains to make and use the same, I will now proceed to describe its construction and operation, referring to the annexed drawing, which forms a part of this specification, and in which—

Figure 1 is a side elevation, and

Figure 2 a plan view of a thrashing-machine separator with my improvements attached thereto.

In the drawing I have only deemed it necessary to represent so much of a thrashing-machine separator as is required to show my improvements.

A represents the screen-shoe, which is moved within the frame B, back and forth, by the rod *a* from the crank-shaft C.

Above the shoe A, running across the same, is a series of shafts, D D, which have their bearings in the frame B, and are provided with arms *b b*. These arms point toward the rear of the machine, as shown.

The shafts D D are on one side provided with cranks *e e*, connected by couplings *d d*, and operated by the pitman *f*, which is attached to a crank-wheel on the end of the shaft C.

Attached to the ends of the screen-shoe A are suitable rods, which support bars E E running lengthwise above the screens between the arms *b b*, above the shafts D D.

These bars are provided with teeth slanting forward in such a manner that, as they are moved back and forth with the shoe, they will in their forward movement catch the thrashed grain immediately as it leaves the cylinder or thrashing portion of the machine, and move it backward, while they partially separate the grain, causing it to fall into the screen. Thus the straw is moved over the arms *b b*, the rapid motion of which thoroughly separates all remaining grain from it.

It is a well-known fact that the separation of the grain from the straw after being thrashed is the most difficult, uncertain, and imperfectly-accomplished part of the operation with other machines, and in their construction requiring much the greater bulk and weight of machinery, both of which are objectionable, besides the great expense.

These objections are entirely overcome by my improvements, as they are in close proximity to the thrashing-cylinder, and by their construction materially lessen the necessary space, weight, and expense, and make the draft much easier, being less machinery to operate.

In rear of the machine, and separate from it, is supported a revolving fan or fork, G, moved by a belt from the machine, for the purpose of throwing the straw and chaff a distance from the machine.

Having thus fully described my invention,

What I claim as new, and desire to secure by Letters Patent, is—

The combination and arrangement of fork G, shoe A, toothed bars E E, shafts D D, arms *b b*, couplings *d d*, rods *f a*, and crank-shaft C, as and for the purpose set forth.

In testimony that I claim the foregoing I have hereunto set my hand this 25th day of November, 1870.

JAMES W. HUNTOON.

Witnesses:
 JAMES PATTERSON,
 RUDOLPH ANDERSON.